US008831977B2

(12) United States Patent
Tischer (10) Patent No.: US 8,831,977 B2
(45) Date of Patent: Sep. 9, 2014

(54) METHODS, SYSTEMS, AND COMPUTER PROGRAM PRODUCTS FOR IMPLEMENTING PERSONALIZED DISSEMINATION OF INFORMATION

(75) Inventor: Steven Tischer, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1977 days.

(21) Appl. No.: 11/861,435

(22) Filed: Sep. 26, 2007

(65) Prior Publication Data

US 2009/0083143 A1 Mar. 26, 2009

(51) Int. Cl.
*G06Q 30/00* (2012.01)
*G06Q 30/02* (2012.01)

(52) U.S. Cl.
CPC ........... *G06Q 30/0264* (2013.01); *G06Q 30/02* (2013.01)
USPC ..................................................... 705/14.53

(58) Field of Classification Search
CPC .................................................... G06Q 30/02
USPC .................................... 705/1–30; 707/10–20
See application file for complete search history.

(56) References Cited

U.S. PATENT DOCUMENTS

| 5,602,811 | A  | * | 2/1997  | Ogusu et al. ............... 369/30.05 |
| 6,807,558 | B1 | * | 10/2004 | Hassett et al. ................ 709/203 |
| 2005/0100157 | A1 | * | 5/2005 | Gray et al. ............... 379/265.01 |
| 2008/0028036 | A1 | * | 1/2008 | Slawson et al. ............... 709/217 |

* cited by examiner

*Primary Examiner* — Sun Li
(74) *Attorney, Agent, or Firm* — Cantor Colburn LLP (57) ABSTRACT

Methods, systems, and computer program products for implementing personalized dissemination of information are provided. A method includes receiving personal information elements for a subject, and applying business rules to the personal information elements, data elements designated for publication by a source of the data elements, and a database of information strings. The information strings include words and phrases that are commonly recognized across a populace. In response to application of the business rules, the method also includes selecting one or more of the data elements from the source, one or more of the personal information elements, and an information string from the database of information strings. The method further includes constructing a contextually relevant output string that is relevant to the subject. The output string includes portions of the selected information string, data elements, and personal information elements. The method further includes conveying the output string to the subject.

20 Claims, 5 Drawing Sheets

```
LAYER CAKES 50% OFF

BIRTHDAY AND GRADUATION SUPPLIES 25% OFF

ALL BABY FOOD ON SALE 10-30% OFF
.....
.....

EFFECTIVE SALES DATE: 30MAY - 15JUN
```

FIG. 4A

```
DATE

TIME    CH      LISTING

8:00   DIS     100 GREATEST SCIENTIFIC
                DISCOVERIES
 ....
 ....

....   ESPN    KENTUCKY DERBY

A TALE OF TWO BIRTHDAYS!!....

....AND TWIN CAKES AT XYZ SUPERMARKET -- NOW 50% OFF

*FIG. 5A*

MIRACLE ON CELADOR STREET!!....

....CELEBRATE YOUR GRADUATE'S DAY AND TAKE 25% OFF!!

*FIG. 5B*

DESPERATELY SEEKING "ALEX'S BUGS"....

....WATCH "100 GREATEST SCIENTIFIC DISCOVERIES" TONIGHT ON THE DISCOVERY CHANNEL(R)

*FIG. 5C*

"ZEN AND THE ART OF ANNA'S HORSERIDING MAINTENANCE"....

....KENTUCKY DERBY AIRS TONIGHT ON ESPN(R)

*FIG. 5D*

"ARE WE THERE YET?"....

....SOUND FAMILIAR? TRY SKIPPY'S FAMILY RESTAURANT (TAKE I-95 SOUTH TO EXIT 17 - FIRST SET OF LIGHTS)

*FIG. 5E*

METHODS, SYSTEMS, AND COMPUTER PROGRAM PRODUCTS FOR IMPLEMENTING PERSONALIZED DISSEMINATION OF INFORMATION

BACKGROUND

Embodiments relate generally to information technology, and more particularly, to methods, systems, and computer program products for implementing personalized dissemination of information.

Due to the explosion of communications technologies, individuals are being deluged with information from an ever-increasing number of communications channels. In the past, information was primarily conveyed by written media, such as newspapers and magazines, and also by radio broadcast. Today, the public is subjected to information overload from a wide range of media sources, such as radio, television, Internet, billboards, telephone (e.g., telemarketers), messaging applications, written media, etc. Most of this information overload is directed to advertising.

For content service providers, such as television and radio programming providers, advertising has been a popular means for communicating advertisements for many years. However, in order to be effective, an advertisement, or any other type of information to be disseminated, needs to be perceived by the targeted audience. There are some measures taken to increase the chances a desired target audience will see the advertisement. In fact, many advertising enterprises will determine a desired target audience based upon a particular type of programming. For example, an advertisement directed to an MP3 player may be presented during a program that features music (e.g., concert, music awards show, etc.). In addition, programming content created for a particular age range (e.g., cartoons for children under 14) may be used to determine advertising placement. However, there are many variables that may influence the target audiences' viewing choices, such that an advertiser may not fully be able to quantify or appreciate the actual success or failure of a particular advertisement (e.g., digital video recording devices that skip commercials may result in lower saturation of the advertisement in the target audience). The same or similar issues apply equally to other types of communications channels.

Even if the information is successfully relayed to the targeted audience, there are other considerations that may affect the impact of the information on the audience. For example, the timing of an advertisement (e.g., the audience perceives the advertisement but has no need for the item being advertised), the form/content of the advertisement (e.g., the audience may have a need for the item but fails to fully perceive the advertisement due to poor presentation—where, e.g., the advertisement lacks creativity, interest), etc. When the form or content of the advertisement is lacking, the result is a failure to connect with the targeted audience. Thus, many providers of information dissemination services are constantly seeking new ways to reach a targeted audience and ensure the information disseminated persists and endures in the minds of the targeted audience.

Even as information, such as advertising, is increasingly matched to ever finer demographic groups, there is precious little if any use of personal information in crafting content components so they maximally resonate with the intended recipient.

BRIEF SUMMARY

Exemplary embodiments include methods for implementing personalized dissemination of information. A method includes receiving personal information elements for a subject, and applying business rules to the personal information elements, data elements designated for publication by a source of the data elements, and a database of information strings. The information strings include words and phrases that are commonly recognized across a populace. In response to application of the business rules, the method also includes selecting one or more of the data elements from the source, one or more of the personal information elements, and an information string from the database of information strings. The method further includes constructing a contextually relevant output string that is relevant to the subject. The output string includes portions of the selected information string, data elements, and personal information elements. The method further includes conveying the output string to the subject.

Additional exemplary embodiments include systems for implementing personalized dissemination of information. A system includes a host system executing a rules engine. The rules engine implements a method. The method includes receiving personal information elements for a subject, and applying business rules to the personal information elements, data elements designated for publication by a source of the data elements, and a database of information strings. The information strings include words and phrases that are commonly recognized across a populace. In response to application of the business rules, the method also includes selecting one or more of the data elements from the source, one or more of the personal information elements, and an information string from the database of information strings. The method further includes constructing a contextually relevant output string that is relevant to the subject. The output string includes portions of the selected information string, data elements, and personal information elements. The method further includes conveying the output string to the subject.

Further exemplary embodiments include computer program products for implementing personalized dissemination of information. A computer program product includes instructions for causing a computer to implement a method. The method includes receiving personal information elements for a subject, and applying business rules to the personal information elements, data elements designated for publication by a source of the data elements, and a database of information strings. The information strings include words and phrases that are commonly recognized across a populace. In response to application of the business rules, the method also includes selecting one or more of the data elements from the source, one or more of the personal information elements, and an information string from the database of information strings. The method further includes constructing a contextually relevant output string that is relevant to the subject. The output string includes portions of the selected information string, data elements, and personal information elements. The method further includes conveying the output string to the subject.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Methods, systems, and computer program products for implementing personalized dissemination of information services are provided in accordance with exemplary embodiments. The personalized dissemination of information services (PDIS) uses personal information about an individual, push information from various information sources, information strings that are widely recognized across a defined populace, and applies business rules to the personal information, push information, and information strings to create an output string designed to resonate and persist with the intended recipient in a creative and interesting way.

Figure 1:
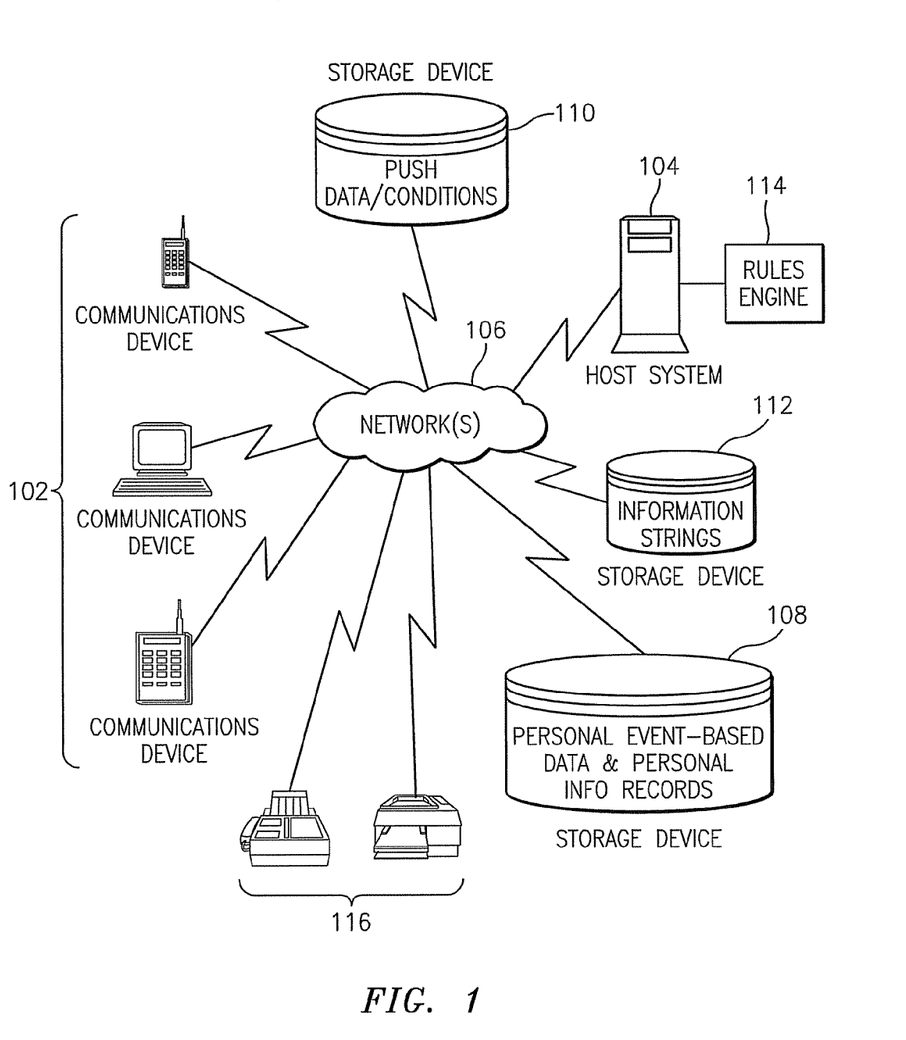
FIG. 1 is a block diagram depicting a system upon which personalized information dissemination services may be implemented in exemplary embodiments.

Referring to FIG. 1, a system for implementing PDIS includes one or more communications devices 102 in communication with a host system 104 via one or more networks 106. The host system 104 executes computer instructions for performing PDIS functions. The host system 104 may be implemented using a high-speed processing device (e.g., a computer system) that is capable of handling high volume activities conducted via communications devices (e.g., the communications devices 102), and other network entities. The host system 104 may be implemented by a network service provider, content service provider, or other enterprise.

The communications devices 102 may include cellular telephones, personal computers, personal digital assistants, or other communications devices. The cellular telephone may operate over a wireless cellular network (e.g., one of the networks 106) using various wireless protocols. The personal computer may be a general-purpose desktop or laptop system that operates over one or more of the networks 106 via an access technology such as, but not limited to, digital subscriber line (DSL) technology, cable modem technology, or dial-up technology. The personal digital assistant may operate over a wireless data network, using Internet protocols (e.g., TCP/IP). The portable or mobile communications devices 102 (e.g., cellular telephone, laptop, personal digital assistant) may be configured to include global positioning system (GPS) technology as will be described further herein.

It will be understood that other types of the communications devices 102 may be employed in implementing the PDIS. The above-described communications devices 102 are provided as non-limiting examples only and are not intended to limit the scope of the exemplary embodiments described herein. For example, FIG. 1 illustrates peripheral devices 116, which comprise a facsimile and a printer. Output string messages created by the PDIS may be instantiated via a facsimile or printer associated with an individual targeted for dissemination of information. In another example, an Internet Protocol-enabled television (IPTV) may be used as the communications device 102 in implementing the PDIS, whereby output string messages are displayed electronically on a display device of an IPTV-enabled television. In addition, 'commercial' communications devices such as electronic advertising billboards, marquis, may be utilized as the communications devices 102 in implementing the PDIS of the exemplary embodiments.

In one exemplary embodiment, the communications devices 102 are owned/operated by one or more individuals that share some relationship (e.g., members of a household). While only three communications devices 102 are shown in FIG. 1, it will be understood that many such communications devices may be used to form a community of communications devices. For example, a wireline PSTN telephone, SIP telephone, dual-mode mobile telephone, may be included in the system of FIG. 1. Alternatively, the communications devices 102 may each be operated/owned by separate, independent entities. The host system 104 implements one or more applications for establishing and utilizing the PDIS.

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. The communications device 102 may be coupled to the host system 104 through multiple networks (e.g., intranet and Internet) so that not all communications devices 102 are coupled to the host system 104 through the same network. As indicated above, one or more of the communications devices 102 and the host system 104 may be connected to the network 106 in a wireless fashion.

The host system 104 is also in communication with storage devices 108, 110, and 112 over networks 106. Storage devices 108, 110, and 112 each includes a data repository with data for use in implementing the PDIS and may be implemented using a variety of devices for storing electronic information. It is understood that the storage devices 108, 110, and 112 may be implemented using memory contained in the host system 104, or the storage devices may be separate physical devices. The storage devices 108, 110, and 112 are logically addressable as consolidated data sources across a distributed environment that includes the network 106. Information stored in the storage devices 108, 110, and 112 may be retrieved and manipulated via the host system 104. The data repositories may include one or more databases containing records in support of the PDIS.

Figure 3:
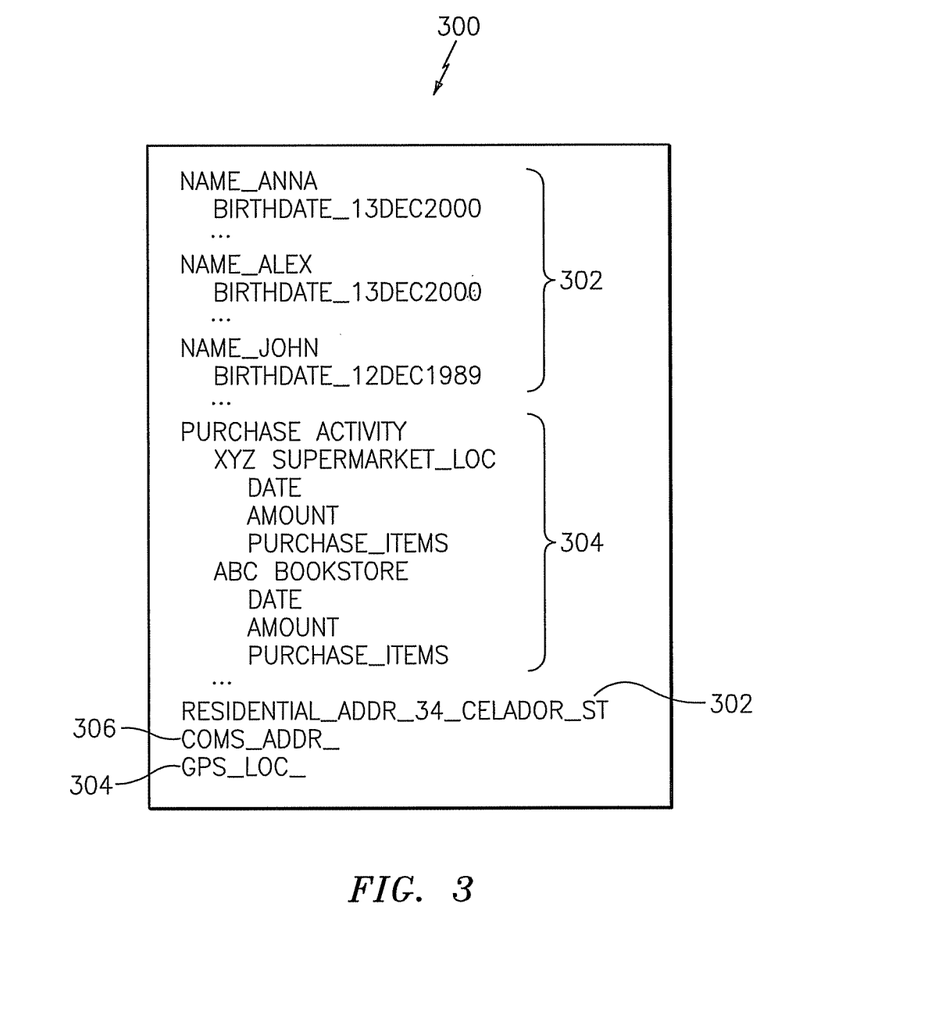
FIG. 3 depicts a subject record created by the personalized dissemination of information services in exemplary embodiments.

The storage device 108 stores personal event-based data and personal information records, according to exemplary embodiments. A sample personal information record 300 (also referred to herein as "subject record") with sample data is shown in FIG. 3. In exemplary embodiments, personal event-based data, or personal information elements, refer to experiential activities conducted by, or on behalf of, an individual. The experiential activities may be network-based activities, such as web searches, online shopping and purchases, and calendar events recorded in an online electronic calendar (e.g., Google® calendar). The network-based activities may further include global positioning system (GPS)-based communications transmitted between a GPS device and satellite system that identify a physical location of an individual at a given point in time. The experiential activities may be digital, non-network based activities, such as calendar events recorded in a personal electronic calendar stored on an individual's communications device, such as the communications device 102, whereby the communications device 102 includes at least a portion of a rules engine 114 executing thereon. In addition, or alternatively, the experiential activities may be physical activities, such as in-store purchases using, e.g., a credit card, store card, bank card. According to exemplary embodiments, the PDIS gathers identifying information associated with the individual from these events. The identifying information may include, e.g., individual's name, address, credit card/bank card accounts, communications device 102 identifier (e.g., telephone number, email or Internet address), or other unique identifier. The personal event-based data is parsed in order to identify personal descriptors (also referred to as attributes) that are correlative with the individual. Example attributes may include, e.g., name, address, age, date of birth, interests, preferences, hobbies, employment data, family information (e.g., number of children, household members), and physical location of the individual at a given point in time. A subject record, such as the subject record 300, is created that includes these attributes and identifying information, an example of which is shown in FIG. 3.

Figure 4A:
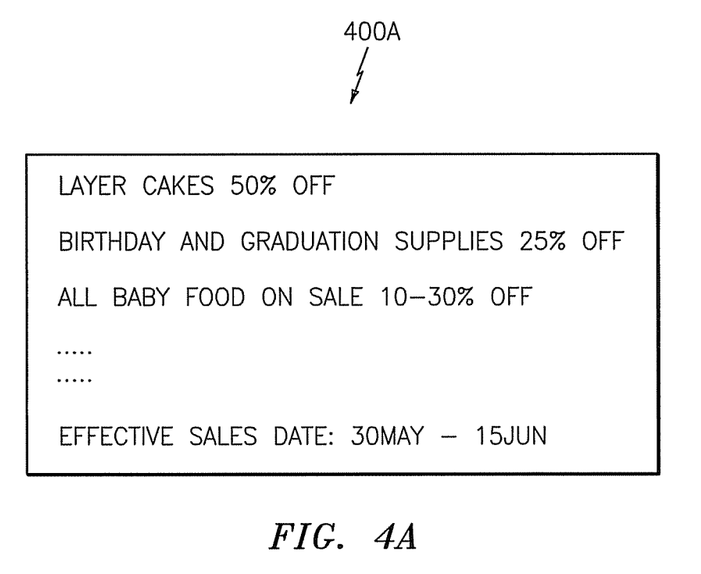
FIGS. 4A-4B depict push records utilized by the personalized dissemination of information services in exemplary embodiments.
Figure 4B:
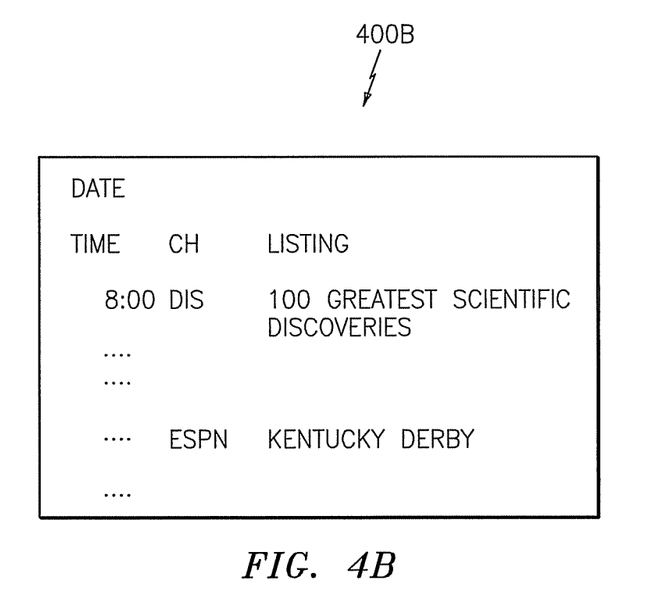

According to exemplary embodiments, the storage device 110 stores push data/conditions. In an exemplary embodiment, push data refers to any information designated for publication to a target individual or group. Push data may include advertising, public service announcements (PSAs), originating from an entity. For example, a grocery store chain may create weekly advertisements for dissemination to a selected group of consumers as defined by various push conditions (e.g., those within a pre-defined geographic proximity of a particular store location; those consumers who, on average, frequent the particular store location on a weekly basis; those consumers who spend an amount of money on average that meets or exceeds a designated threshold). In another example, a content provider system that creates listings of programming materials may wish to advertise selected upcoming programming. Alternatively, a business enterprise may wish to advertise business products/services to transient individuals (individuals who are traveling, whereby their location is identified by GPS) who are identified as being present in a location that is in geographic proximity of the business enterprise. FIGS. 4A-4B depict push records 400A, 400B including sample data utilized by the PDIS in exemplary embodiments.

According to exemplary embodiments, the storage device 112 stores information strings that are commonly known to a defined populace (e.g., a group defined by shared characteristics such as geography, language, and culture, to name a few). In an exemplary embodiment, information strings include words or phrases that have received a level of exposure to the general public (or defined populace), such that the information strings are readily and widely recognizable by the general public or defined populace. Information strings may be derived from best selling or classic novels or books, and may include titles, passages, and quotes. Likewise, information strings may include titles, quotes, lines, from other media, such as television shows, movies, and plays. Information strings may include phrases or topical information derived from current events (e.g., via news headlines, pop culture). Information strings may be taken from well-known music, theatre. These information elements will be described further herein.

The host system 104 depicted in FIG. 1 may be implemented using one or more servers operating in response to a computer program stored in a storage medium accessible by the server. The host system 104 may operate as a network server (e.g., a web server) to communicate with the communications device 102. The host system 104 handles sending and receiving information to and from the communications device 102 and can perform associated tasks.

The host system 104 may also operate as an application server. According to exemplary embodiments, the host system 104 executes the rules engine 114 to provide PDIS functions. As previously described, it is understood that separate servers may be utilized to implement the network server functions and the application server functions. Alternatively, the network server, the firewall, and the application server may be implemented by a single server executing computer programs to perform the requisite functions. The rules engine 114 may include business rules and conditions for creating output strings tailored for a designated audience. For example, the business rules may include phonetics (e.g., speech sounds), rhymes (including measure, meter formations, and rhythm), number or range limits on the number of words in the output string, foreign languages, and information string categories, to name a few. The information string categories may be classified according to types of information sources (e.g., books, movies, music, theatre), and each of the types of information sources may be further broken down in sub-categories (e.g., books may be further classified by age range, humor, history, satire, hobbies, etc.; news may be further classified by politics, International news, entertainment news, sports). In exemplary embodiments, the rules engine 114 includes logic for identifying the syntax and discourse structure of the information elements processed for use in creating the output string.

Figure 2:
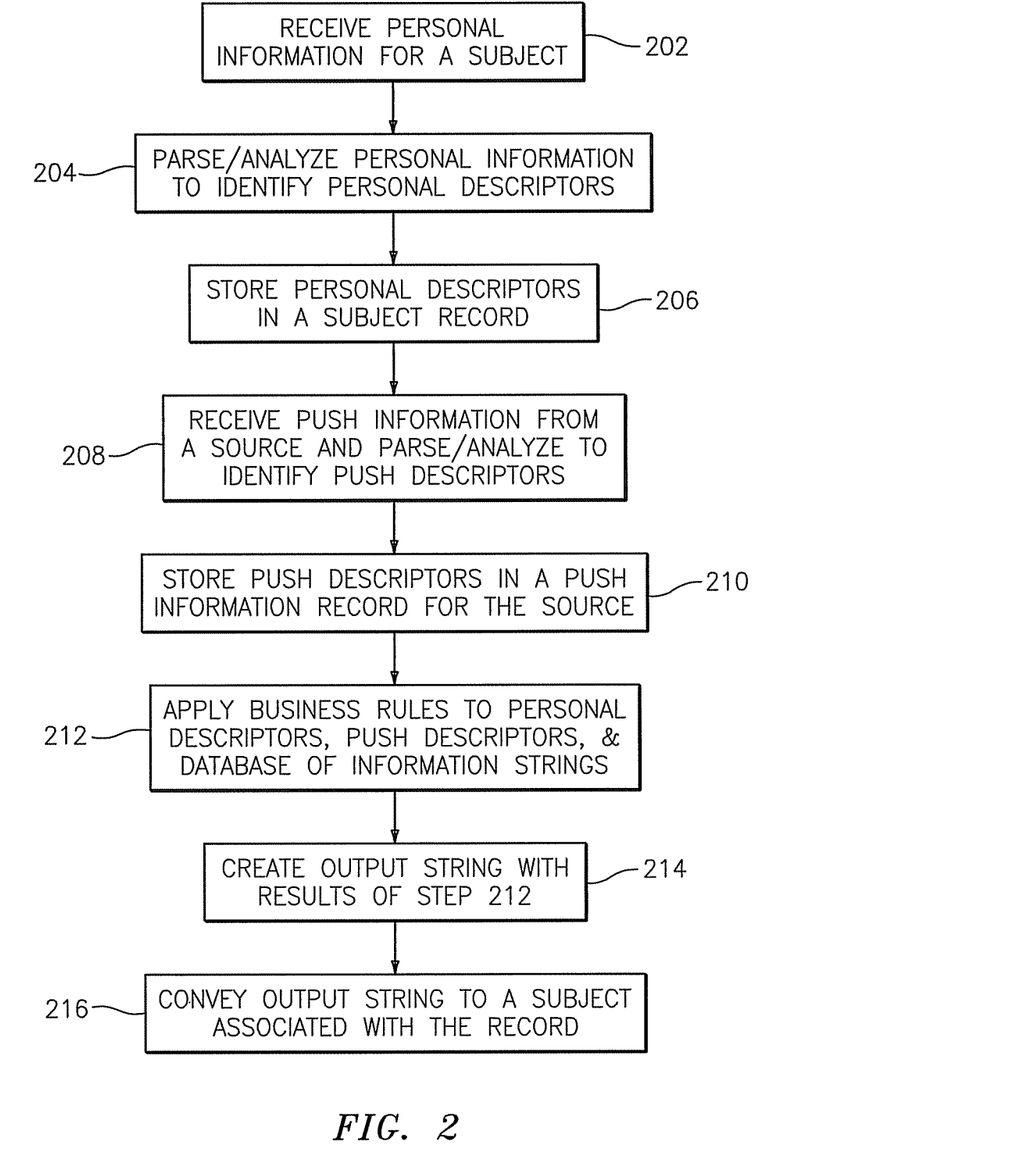
FIG. 2 is a flow diagram describing a process for implementing personalized dissemination of information services in exemplary embodiments.

Turning now to FIG. 2, a flow diagram describing a process for implementing PDIS will now be described in exemplary embodiments. At step 202, personal data relating to an individual is collected from one or more information sources in response to various events. Personal data includes identifying information concerning an individual or family, such as name, address, credit card accounts, bank card accounts, and store card accounts, and any other information that identifies an individual. Identifying information may also include a communications device identifier, such as a cellular telephone number, Internet Protocol-based address of an individual's communication devices (e.g., the communications devices 102). Examples of this personal data are shown as data elements 302 in record 300 of FIG. 3.

In addition, personal event-based data is also collected on individuals. As indicated above, personal event-based data, or personal information elements, refer to data relating to experiential activities conducted by, or on behalf of, an individual. The experiential activities may be network-based activities, such as web searches, online shopping and purchases, and calendar events recorded in an online electronic calendar (e.g., Google® calendar). Examples of these experiential activities are shown as data elements 304 in record 300 of FIG. 3.

The network-based activities may further include global positioning system (GPS)-based communications transmitted between a GPS device and satellite system that identify a physical location of an individual at a given point in time. This information may be tracked in data element 306 of FIG. 3. The experiential activities may be digital, non-network based activities, such as calendar events recorded in a personal electronic calendar stored on the individual's communications device 102. Some or all of these events may be conducted using one or more of the communications devices 102, which are collected and exploited by the rules engine 114 as described herein.

The personal data is parsed and analyzed to identify personal descriptors (attributes) at step 204. In exemplary embodiments, the rules engine 114 includes logic for parsing the personal data into data elements that can be associated with meta-data that describes the data elements. For example, meta-data element "family_name" may include personal descriptor, "Smith" and the meta-data element "name" may include personal descriptors, "Alex," "Anna," and "John", which have been collected via the PDIS and the rules engine 114.

At step 206, the personal descriptors are stored in a subject record, such as the subject record 300. The subject record 300 including sample data is shown in FIG. 3. The subject records may be stored in the storage device 108. Alternatively, if the PDIS and the rules engine 114 are implemented on an individual's communication device, such as the communication device 102, the subject records 300 may be specific to the owner/operator of the communications device 102 and/or family members associated therewith and may be stored on the individual's communication device 102, along with the push data and information strings. The event data collected may be derived from, e.g., the user's personal calendar, locally stored email folder.

At step 208, data elements (push data) are received from an information source. The data elements may be parsed and analyzed to identify push descriptors (also referred to herein as "push information"). At step 210, the push descriptors may be stored in a push information record, such as the push information records 400A, 400B, samples of which are shown in FIGS. 4A-4B. For purposes of illustration, FIG. 4A represents a grocery store flyer and FIG. 4B represents a television programming listing for an electronic programming guide. As indicated above, push data refers to any information designated for publication to a target individual or group. For example, the push information may be an advertisement.

At step 212, business rules are applied to the personal descriptors, push descriptors, and a database of information strings via the rules engine 114. As indicated above, the business rules may be configured to utilize phonetics (e.g., speech sounds), rhymes (including measure, meter formations, and rhythm), number or range limits on the number of words in the output string, foreign languages, and information string categories, to name a few. The information string categories may be classified according to types of information sources (e.g., books, movies, music, theatre), and each of the types of information sources may be further broken down in sub-categories (e.g., books may be further classified by age range, humor, history, satire, hobbies; news may be further classified by politics, International news, entertainment news, sports). In exemplary embodiments, the rules engine 114 includes logic for identifying the syntax and discourse structure of the information elements processed for use in creating the output string.

At step 214, the rules engine 114 creates a contextually relevant output string from results of step 212, samples of which are shown in FIGS. 5A-5E. For purposes of illustration, the rules engine 114 is applied to the subject record 300 of FIG. 3 and the push information records 400A, 400B of FIGS. 4A-4B in creating output strings shown in FIGS. 5A-5E, as will now be described.

Figure 5A:
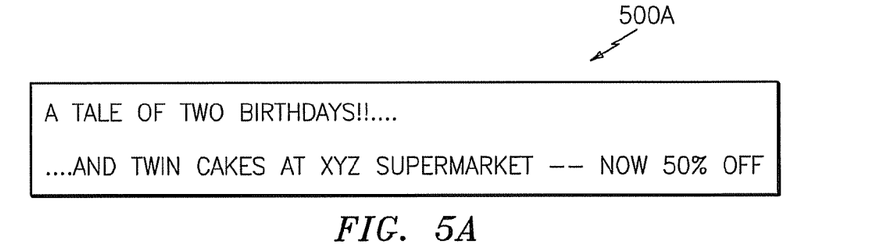
FIGS. 5A-5E depict output string messages created by the personalized dissemination of information services using the subject record of FIG. 3 and the push records of FIGS. 4A-4B in exemplary embodiments.
Figure 5B:
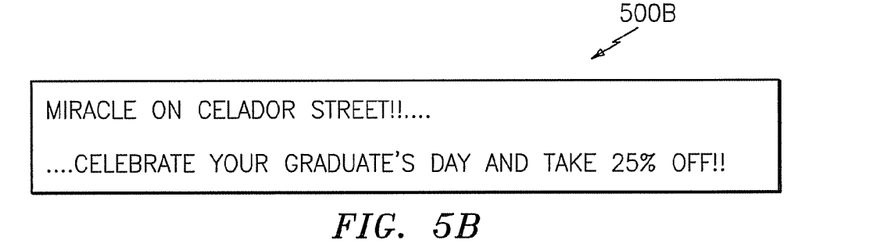

By way of example, the subject record 300 of FIG. 3 and the push information records shown in FIGS. 4A and 4B are processed by the rules engine 114, which searches information strings stored in the storage device 112 using the business rules. The attributes shown in FIG. 3 (e.g., NAME_ANNA, BIRTHDATE_13DEC2000 and NAME_ALEX, BIRTH-DATE_13DEC2000) identify individuals and their birthdates. From the attribute data, it can be gleaned from the birth dates that two of the three individuals are twins. The rules engine 114 may use various terms associated with twins (e.g., two, couple, etc.) to search information strings stored in the storage device 112. The push data in FIG. 4A reveals that the grocery store is advertising layer cakes, as well as birthday supplies for a specified date range. A search of the information strings in the storage device 112 may result in several candidates for use in creating an output string. Suppose that one of the candidates found is "A TALE OF TWO CITIES." This search result was produced, in part, because it includes the word, "TWO." The rules engine 114 may substitute some of the personal attributes, as well as the push data for elements in the information string in order to create a new output string using, e.g., basic grammar and sentence structure rules. Using the above example, the output string illustrated in FIG. 5A is produced. As shown in a frame 500A of FIG. 5A, the term, "CITIES" has been changed to "BIRTHDAYS" and the term "TWIN" has been added to the push data.

In another example, personal attributes reveal that another individual, JOHN is about to graduate from school. Again, the push data in FIG. 4A reveals that the grocery store has graduation supplies on sale. The rules engine 114 searches information strings in the storage device 112, using personal attributes JOHN and GRADUATE and STREET ADDRESS, and the business rules include, e.g., using phonetics. The resulting information string is "MIRACLE ON $34^{TH}$ STREET." This information string resulted because the phonetic similarity between Celador and 34, both of which correspond to street names. In addition, there is an indirect relationship between GRADUATE and MIRACLE when applying business rules that are directed to humor. The output string created by the PDIS is shown in a frame 500B in FIG. 5B.

Figure 5C:
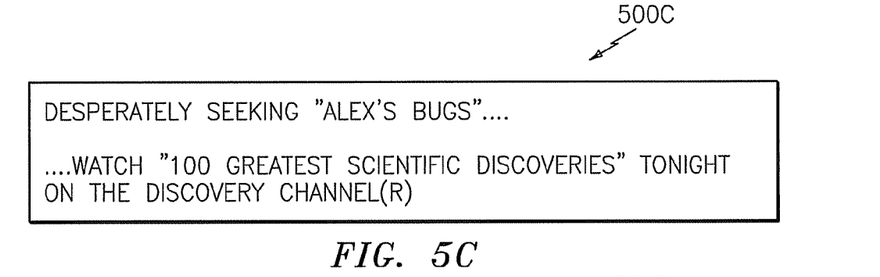
Figure 5D:
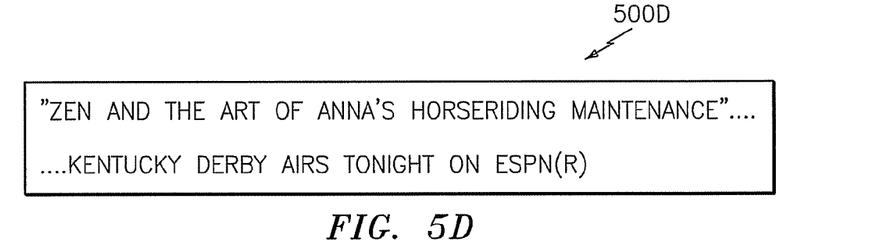

A frame 500C of FIG. 5C is yet another example of the PDIS application to the subject record 300 and push data from FIG. 4B. The information string resulting from the search of the storage device 112 revealed, "DESPERATELY SEEKING SUSAN." While not shown in FIG. 3, it has been determined that ALEX's interests include insects. This information may have been derived from purchases made to a bookstore, online activities. A frame 500D of FIG. 5D illustrates yet another programming example.

Figure 5E:
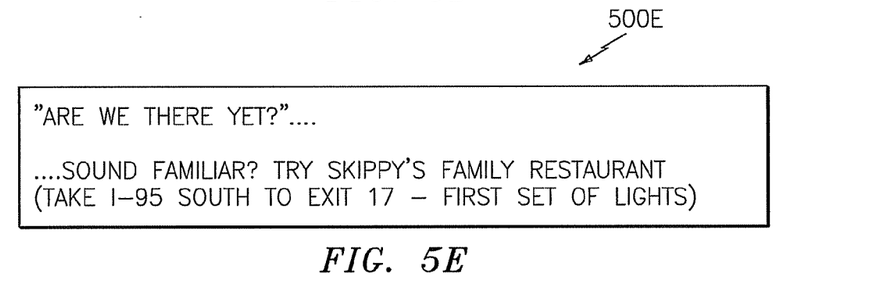

A frame 500E of FIG. 5E illustrates an advertisement created using GPS data. For example, a family is traveling on vacation and utilizes a GPS system in the vehicle. The advertiser in this example is a family restaurant that caters to local residents, as well as vacation travelers, perhaps because of its convenient location with respect to a vacation route. The personal attributes reflect that a family with children is traveling en route near the restaurant. The push data includes the restaurant name and address. Upon a search of information strings, the rules engine 114 identifies a catch phrase "ARE WE THERE YET?" The output string includes the catch phrase and the restaurant information.

At step 216, the output string is conveyed to the subject on the communications device 102, or alternative means such as one of peripheral devices 116. For example, the output string concerning the grocery store advertising may be transmitted to a cellular telephone number associated with the recipient and displayed on the recipient's cellular telephone. The output string concerning the programming may be transmitted to a set top box associated with the recipient and displayed in the electronic programming guide at the recipient's address. The output string concerning the restaurant advertising may be transmitted via the GPS, cellular communications device, PDA, associated with the recipient.

By providing customized, interesting, and timely information to a recipient, the information is more likely to be perceived and remembered by the recipient, thereby ensuring greater success in establishing a desired impact on the recipient.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing personalized dissemination of information, comprising:
   receiving, at a computer processor, personal information elements for a subject;
   applying, via a rules engine executing on the computer processor, business rules to the personal information elements, push data elements designated for publication by a source of the push data elements, and a database of information strings, the information strings comprising words and phrases that are commonly recognized across a defined populace, wherein the business rules are configured to use phonetics and rhyming schemes, the rhyming schemes including measure, meter formations, and rhythm; and
   in response to the applying:
      selecting one or more of the push data elements from the source, one or more of the personal information elements, and an information string from the database of information strings,
      constructing a contextually relevant output string relevant to the subject, the output string including portions of the selected information string, the selected data elements, and the selected personal information elements, wherein the information strings are altered according to phonetics and rhyming schemes selected in response to applying the business rules, and
      conveying the output string to the subject.

2. The method of claim 1, wherein the personal information is received by collecting personal data elements in response to events, the personal information including personally-identifying information, comprising at least one of:
   name;
   address; and
   account data.

3. The method of claim 2, wherein the events include at least one of:
   online activities;
   electronic calendar activities;
   global positioning system location; and
   in-store activities.

4. The method of claim 1, wherein the push data elements include advertising that is selected via the business rules based upon the personalized information elements.

5. The method of claim 1, wherein the business rules are further configured to use at least one of:
   a number of words in the output string;
   foreign languages; and
   information string categories.

6. The method of claim 5, wherein the information string categories are classified according types of information sources, the types of information sources including:
   books;
   movies;
   music; and
   theatre.

7. The method of claim 1, wherein the business rules include logic for identifying syntax and discourse structure of the information elements processed for use in creating the output string.

8. A system for implementing personalized dissemination of information, comprising:
   a host system comprising a computer processor; and
   a rules engine executing on the host system, the rules engine implementing a method, comprising:
   receiving personal information elements for a subject;
   applying business rules to the personal information elements, push data elements designated for publication by a source of the push data elements, and a database of information strings, the information strings comprising words and phrases that are commonly recognized across a defined populace, wherein the business rules are configured to use phonetics and rhyming schemes, the rhyming schemes including measure, meter formations, and rhythm; and
   in response to the applying:
      selecting one or more of the push data elements from the source, one or more of the personal information elements, and an information string from the database of information strings,
      constructing a contextually relevant output string relevant to the subject, the output string including portions of the selected information string, the selected data elements, and the selected personal information elements, wherein the information strings are altered according to phonetics and rhyming schemes selected in response to applying the business rules, and conveying the output string to the subject.

9. The system of claim 8, wherein the personal information is received by collecting personal data elements in response to events, the personal information including personally-identifying information, comprising at least one of:
   name;
   address; and
   account data.

10. The system of claim 9, wherein the events include at least one of:
    online activities;
    electronic calendar activities;
    global positioning system location; and
    in-store activities.

11. The system of claim 8, wherein the push data elements include advertising that is selected via the business rules based upon the personalized information elements.

12. The system of claim 8, wherein the business rules are further configured to use at least one of:
    a number of words in the output string;
    foreign languages; and
    information string categories.

13. The system of claim 12, wherein the information string categories are classified according types of information sources, the types of information sources including:
    books;
    movies;
    music; and
    theatre; and
    wherein the business rules include logic for identifying syntax and discourse structure of the information elements processed for use in creating the output string.

14. A computer program product for implementing personalized dissemination of information, the computer program product including instructions for causing a computer to implement a method, comprising:
    receiving personal information elements for a subject;
    applying business rules to the personal information elements, push data elements designated for publication by a source of the push data elements, and a database of information strings, the information strings comprising words and phrases that are commonly recognized across a defined populace wherein the business rules are configured to use phonetics and rhyming schemes, min schemes including measure, meter formations, and rhythm; and
    in response to the applying:
       selecting one or more of the push data elements from the source, one or more of the personal information elements, and an information string from the database of information strings,
       constructing a contextually relevant output string relevant to the subject, the output string including portions of the selected information string, the selected data elements, and the selected personal information elements, wherein the information strings are altered according to phonetics and rhyming schemes selected in response to apples the business rules, and
       conveying the output string to the subject.

15. The computer program product of claim 14, wherein the personal information is received by collecting personal data elements in response to events, the personal information including personally-identifying information, comprising at least one of:
    name;
    address; and
    account data.

16. The computer program product of claim 15, wherein the events include at least one of:
    online activities;
    electronic calendar activities;
    global positioning system location; and
    in-store activities.

17. The computer program product of claim 14, wherein the push data elements include advertising that is selected via the business rules based upon the personalized information elements.

18. The computer program product of claim 14, wherein the business rules are further configured to use at least one of:
    a number of words in the output string;
    foreign languages; and
    information string categories.

19. The computer program product of claim 18, wherein the information string categories are classified according types of information sources, the types of information sources including:
    books;
    movies;
    music; and
    theatre.

20. The computer program product of claim 14, wherein the business rules include logic for identifying syntax and discourse structure of the information elements processed for use in creating the output string.

* * * * *